United States Patent
Melchoir

(10) Patent No.: US 6,588,177 B1
(45) Date of Patent: Jul. 8, 2003

(54) METHOD AND APPARATUS FOR FORMING A RECLOSABLE PACKAGE

(75) Inventor: Greg W. Melchoir, Green Bay, WI (US)

(73) Assignee: Reynolds Consumer Products, Inc., Richmond, VA (US)

( * ) Notice: Subject to any disclaimer, the term of this patent is extended or adjusted under 35 U.S.C. 154(b) by 0 days.

(21) Appl. No.: 10/061,464

(22) Filed: Feb. 4, 2002

(51) Int. Cl.$^7$ ................................................ B65B 9/20
(52) U.S. Cl. ................ 53/412; 53/133.4; 53/139.2; 53/451; 53/551; 493/214
(58) Field of Search ................ 53/410, 412, 450, 53/451, 133.4, 139.2, 551, 552; 493/213, 214, 927; 156/66

(56) References Cited

U.S. PATENT DOCUMENTS

| | | | |
|---|---|---|---|
| 2,248,471 A | 7/1941 | Stroop | 93/3 |
| 2,761,633 A | 9/1956 | Sindinski | 243/38 |
| 2,978,769 A | 4/1961 | Harrah | 24/201 |
| 3,140,030 A | 7/1964 | Stewart | 226/95 |
| 3,198,228 A | 8/1965 | Naito | 150/3 |
| 3,219,084 A | 11/1965 | Ausnit et al. | 150/3 |
| 3,285,485 A | 11/1966 | Slator | 226/172 |
| 3,381,592 A | 5/1968 | Ravel | 93/8 |
| 3,419,206 A | 12/1968 | Omori | 41/122 |
| 3,439,468 A | 4/1969 | Bok | 53/14 |
| 3,473,589 A | 10/1969 | Gotz | 150/3 |
| 3,506,517 A | 4/1970 | Naito | 156/251 |
| 3,681,890 A | 8/1972 | Pringle, Jr. et al. | 53/14 |
| 3,685,562 A | 8/1972 | Ausnit | 150/3 |
| 3,780,781 A | 12/1973 | Uramoto | 150/3 |
| 3,807,118 A | 4/1974 | Pike | 53/14 |
| 3,815,317 A | 6/1974 | Toss | 53/28 |
| 3,839,128 A | 10/1974 | Arai | 156/583 |
| 3,889,446 A | 6/1975 | Simmons et al. | 53/28 |
| 3,948,705 A | 4/1976 | Ausnit | 156/73.4 |
| 4,046,408 A | 9/1977 | Ausnit | 285/188 |
| 4,101,355 A | 7/1978 | Ausnit | 156/66 |
| 4,136,505 A | 1/1979 | Putnam, Jr. et al. | 53/551 |
| 4,174,597 A | 11/1979 | Mowli et al. | 53/410 |
| 4,235,064 A | 11/1980 | Wenger | 53/451 |
| 4,240,241 A | 12/1980 | Sanborn, Jr. | 53/412 |
| 4,246,288 A | 1/1981 | Sanborn, Jr. | 426/122 |
| 4,277,302 A | 7/1981 | Reid | 156/466 |
| 4,288,965 A | 9/1981 | James | 53/451 |
| 4,354,541 A | 10/1982 | Tilman | 150/3 |
| 4,355,494 A | 10/1982 | Tilman | 53/416 |
| 4,391,079 A | 7/1983 | Cherney | 53/396 |
| 4,391,081 A | 7/1983 | Kovacs | 53/436 |
| 4,423,585 A | 1/1984 | Monsees et al. | 53/451 |
| 4,437,293 A | 3/1984 | Sanborn, Jr. | 53/412 |
| 4,501,109 A | 2/1985 | Monsees | 53/451 |
| 4,532,754 A | 8/1985 | Hokanson | 53/451 |
| 4,589,145 A | 5/1986 | Van Erden et al. | 383/5 |
| 4,617,683 A | 10/1986 | Christoff | 383/63 |
| 4,620,409 A | 11/1986 | McElvy | 53/551 |
| 4,625,496 A | 12/1986 | Ausnit | 53/451 |
| 4,646,511 A | 3/1987 | Boeckmann et al. | 53/551 |

(List continued on next page.)

FOREIGN PATENT DOCUMENTS

| EP | 0276554 | 4/1992 |
|---|---|---|
| GB | 1546433 | 10/1976 |

*Primary Examiner*—John Sipos
(74) *Attorney, Agent, or Firm*—Joseph D. Kuborn; Tracey D. Beiriger

(57) ABSTRACT

A method and apparatus for applying a reclosable profile element, or zipper, to a packaging film. The packaging film is formed into a tubular form about a forming tube. The zipper is received in a guide block formed along the interior of the forming tube. The extended flanges of each member of the zipper are urged flat against the outer circumference of the fill tube. The packaging film is applied over the flanges of the zipper and a header is created by a rod extending along the length of an initial portion of the fill tube. A heated seal bar secures the film to the flanges of the zipper. After the zipper has been attached to the film, the packaging material is urged out of the interior of the fill tube by a changing configuration of the guide block.

13 Claims, 9 Drawing Sheets

U.S. PATENT DOCUMENTS

| | | | |
|---|---|---|---|
| 4,655,862 A | 4/1987 | Christoff et al. | 156/66 |
| 4,663,915 A | 5/1987 | Van Erden et al. | 53/450 |
| 4,698,954 A | 10/1987 | Behr et al. | 53/551 |
| 4,704,842 A | 11/1987 | Boeckmann et al. | 53/450 |
| 4,709,528 A | 12/1987 | Merkus | 53/128 |
| 4,709,533 A | 12/1987 | Ausnit | 53/451 |
| 4,727,709 A | 3/1988 | Zieke et al. | 53/551 |
| 4,745,731 A | 5/1988 | Talbott et al. | 53/451 |
| 4,782,951 A | 11/1988 | Griesbach et al. | 206/484 |
| 4,790,126 A | 12/1988 | Boeckmann | 53/451 |
| 4,840,012 A | 6/1989 | Boeckmann | 53/410 |
| 4,848,928 A | 7/1989 | Ausnit | 383/5 |
| 4,869,048 A | 9/1989 | Boeckmann | 53/451 |
| 4,874,257 A | 10/1989 | Inagaki | 383/63 |
| 4,876,842 A | 10/1989 | Ausnit | 53/410 |
| 4,984,975 A | 1/1991 | Thompson | 53/412 |
| 4,993,212 A | 2/1991 | Veoukas | 53/451 |
| 5,046,300 A | 9/1991 | Custer et al. | 53/412 |
| 5,111,643 A * | 5/1992 | Hobock | 53/551 |
| 5,127,208 A | 7/1992 | Custer et al. | 53/412 |
| 5,425,216 A * | 6/1995 | Ausnit | 53/139.2 |
| 5,551,208 A * | 9/1996 | Van Erden | 53/139.2 |
| 5,561,966 A * | 10/1996 | English | 53/412 |

\* cited by examiner

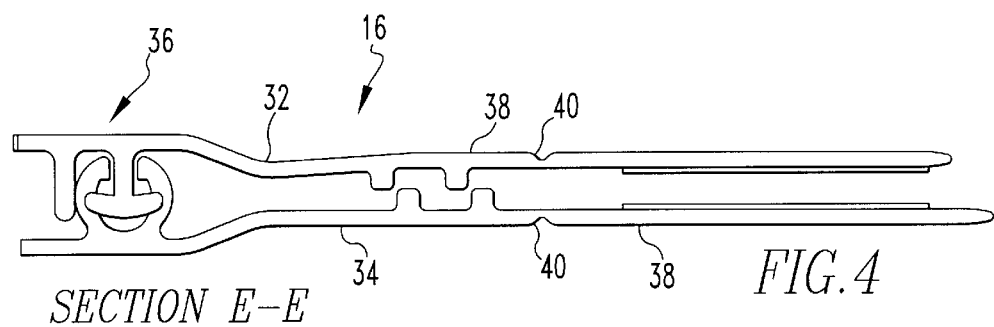
SECTION E-E    FIG.4
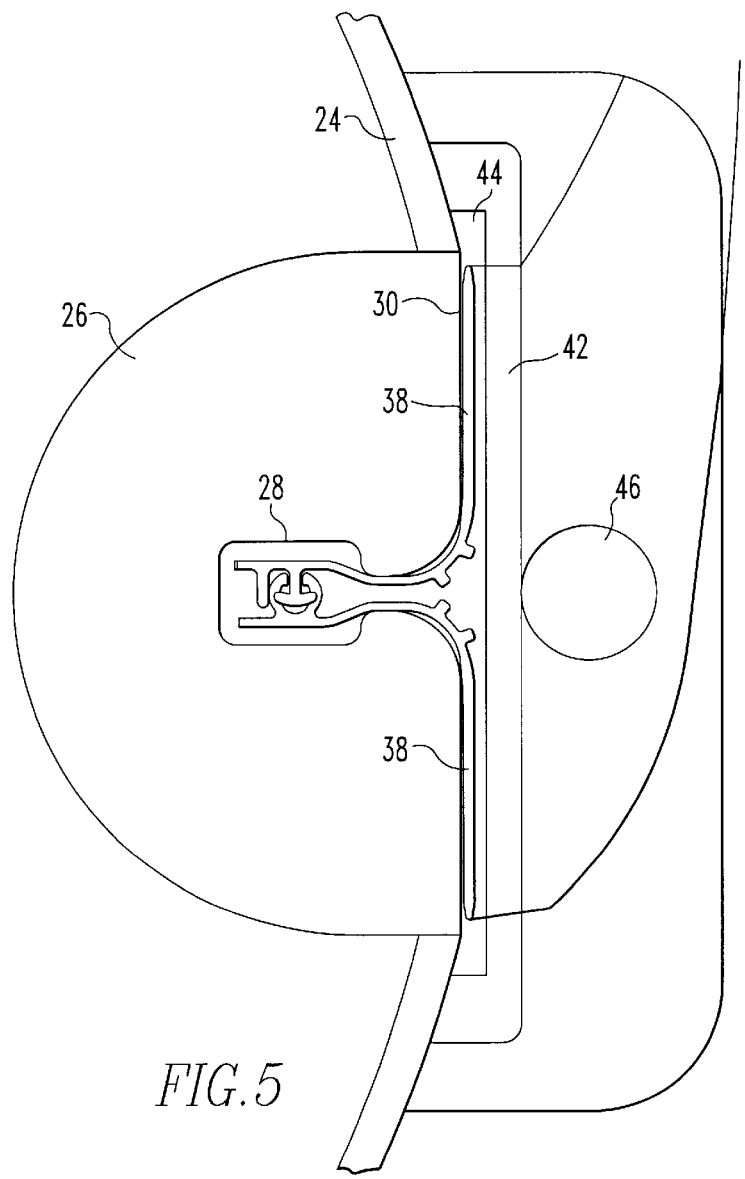
FIG.5

SECTION A-A

SECTION 8-8

SECTION D-D

POSSIBLE PACKAGE CONFIGURATIONS

US 6,588,177 B1

METHOD AND APPARATUS FOR FORMING A RECLOSABLE PACKAGE

BACKGROUND OF THE INVENTION

The present invention relates to the field of reclosable packages and an apparatus used to apply closure elements to a packaging film and form such packages. More particularly, the present invention relates to a method and apparatus for applying reclosable profile elements to a packaging film in a form, fill and seal packaging operation.

One method of forming packages is known as the form, fill and seal method, wherein a continuous length of film is fed forwardly and downwardly over a forming tube, with the marginal edges of the sheet of film being sealed to each other. The thus formed tube of film is cross-sealed, and contents are dropped into the packaging through the tubular mandrel over which the packaging film is formed. An additional cross seal above the contents completes the package, which is then severed from the tubular film.

Reclosable packages having male and female cooperating reclosable elements along an opening or seam of the package have been well known for some time. There are several advantages to forming product-containing packages with such reclosable fasteners. As such, several methods have been developed to produce packages with reclosable fasteners on form, fill and seal equipment.

U.S. Pat. No. 5,127,208 discloses a method and apparatus for forming a reclosable package in which a loop of the packaging film is created along the outside diameter of the fill tube. The reclosable profile element is guided along the exterior of the fill tube into the loop of packaging film and adhered to the inner surface of the loop. The method of the '208 patent includes several inherent drawbacks which are addressed by the method of the present invention.

SUMMARY OF THE INVENTION

The present invention provides a method and apparatus for applying a reclosable fastener to a packaging film during the form, fill and seal formation of a package.

In one aspect of the invention, the packaging apparatus includes a guide block that is formed along the interior of the fill tube and extends down its length. The locking portion of the zipper is received within a shaped groove formed in the guide block. At the same time, a supply of packaging film is received around a forming collar and directed around the outer circumference of the fill tube.

The apparatus includes a knockdown plate spaced from the outer wall of the fill tube that folds the pair of flanges of the zipper down into contact with the outer wall of the fill tube. Each of the profiles of the zipper may or may not include a score mark to encourage the folding of the flange flat against the outer wall of the fill tube.

The packaging film passes over a rod extending parallel to the initial portion of the fill tube. The rod creates the header for the resealable package. Along the initial portion of the fill tube, a heated seal bar straddles the rod and moves into contact with the film and zipper to seal the film to each of the flanges of the zipper.

After the zipper has been attached to the packaging film, drive belts or drive wheels move the combination along the length of the fill tube. As the packaging material moves along the fill tube, the outer surface of the guide block begins to extend outward from the outer surface of the fill tube. At the lowermost portion of the fill tube, the guide block becomes a flat bar to aid in transitioning the package from a tubular member to a flat shape that can be side sealed to form each individual package.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 4 is a section view taken along line E—E of FIG. 3;

FIG. 5 is a magnified view illustrating the feeding of the reclosable profile element into the feed tube;

DETAILED DESCRIPTION OF PREFERRED EMBODIMENTS

Figure 1:
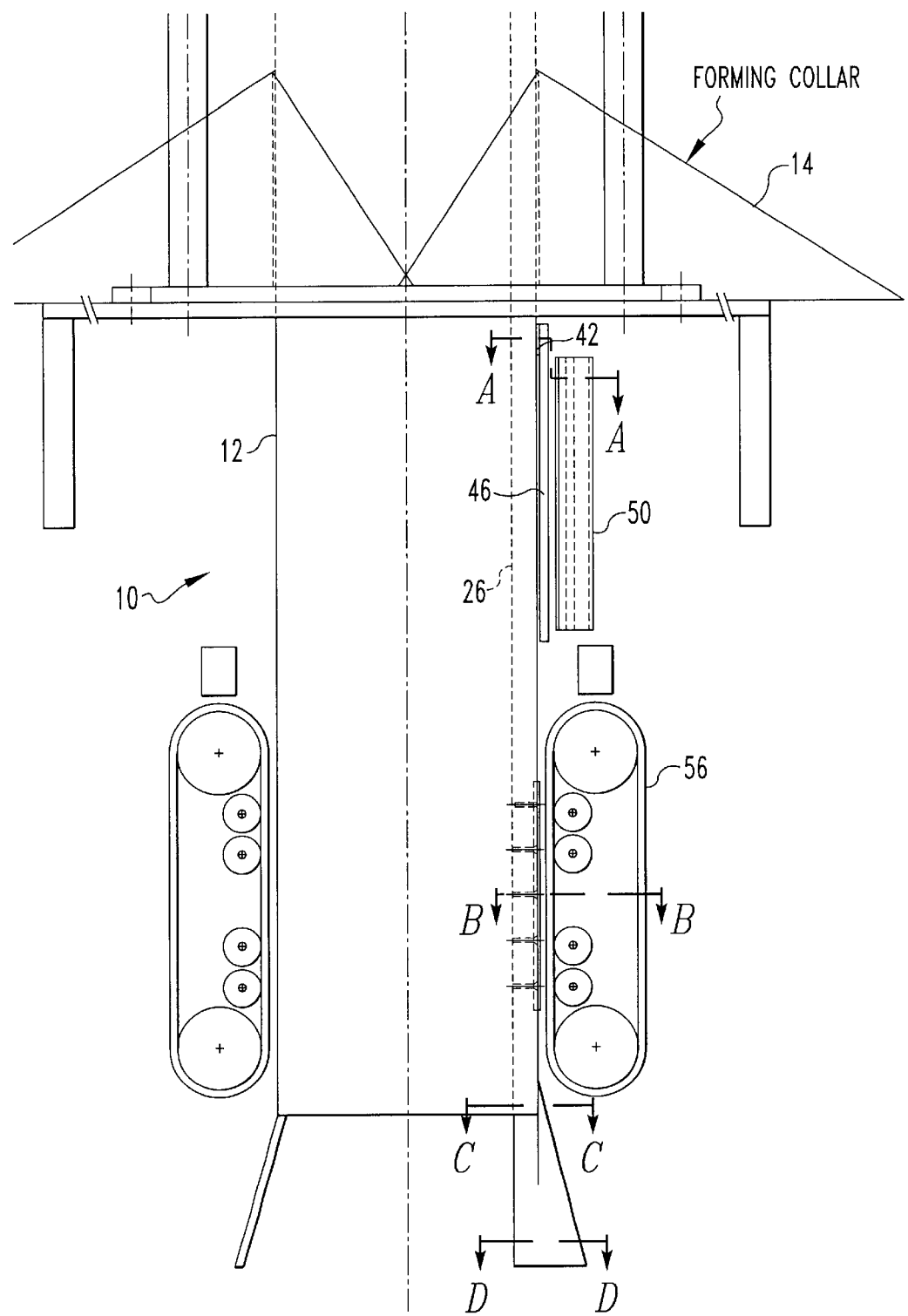
FIG. 1 is an overall view of the apparatus used to form a reclosable package including a reclosable profile element in accordance with the present invention.

Referring now to the drawings, FIG. 1 illustrates an overall view of the form, fill and seal packaging apparatus 10 of a preferred embodiment of the invention. The packaging apparatus 10 generally includes a fill tube 12 having a forming collar 14 positioned at its upper end. The combination of the forming collar 14 and the fill tube 12 is used to form a tube of packaging film that can be filled with product and sealed to form individual product packages.

Figure 2:
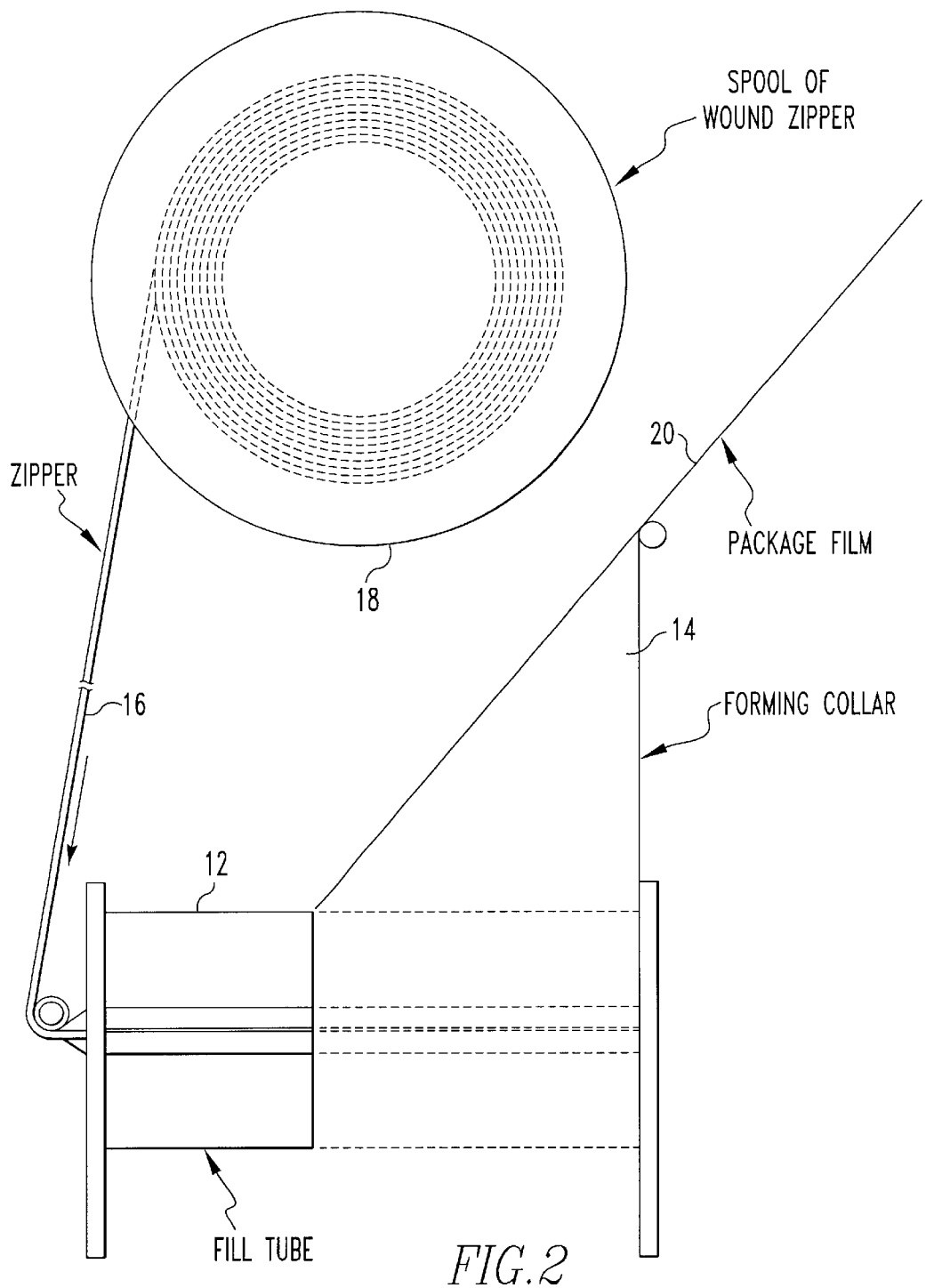
FIG. 2 is a view illustrating the feeding of the reclosable profile element and package film used to generate the reclosable package.

As can be seen in FIG. 2, the packaging apparatus receives a continuous supply of a reclosable profile element, or zipper, 16 from an unwind apparatus 18. The unwind apparatus 18 includes a continuous supply of the zipper 16 for inclusion in the resealable packages being formed by the packaging apparatus 10. As illustrated in FIG. 2, a supply of packaging film 20 is also received by the packaging apparatus 10 and passes over the forming collar 14.

Referring back to FIG. 1, the forming collar 14 is adjacent to the fill tube 12 and is positioned to shape the flat packaging film 20 received from the unwind apparatus into a tubular form surrounding the fill tube 12, as is well known in the state of the art. Although not shown in the Figures, a heat seal apparatus is used to seal the marginal edges of the packaging film into a tubular form. The heat seal apparatus includes seam seal bars of conventional design.

Figure 3:
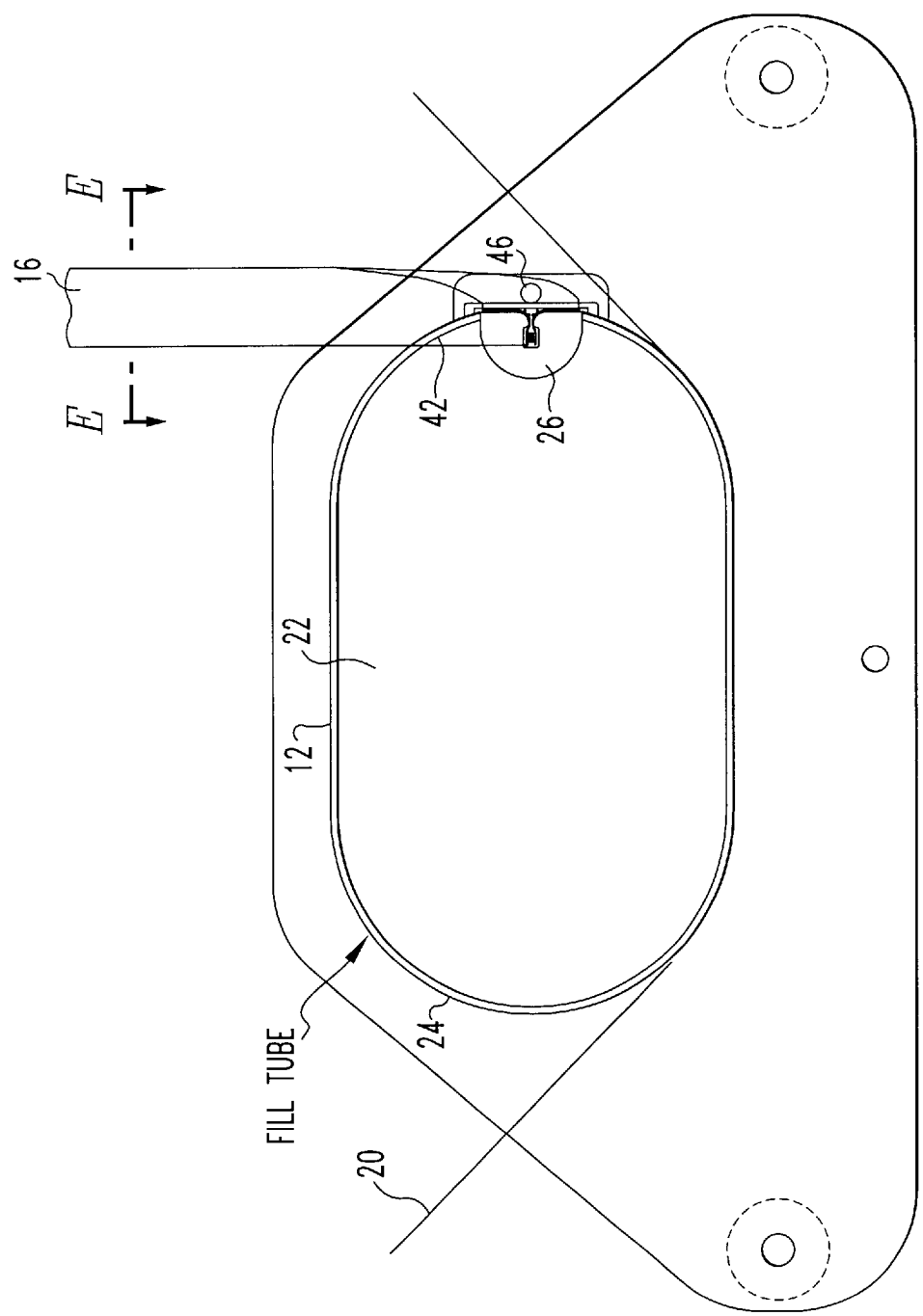
FIG. 3 is a top view of the fill tube illustrating the feeding of the reclosable profile element into the feed tube.

Referring now to FIG. 3, the fill tube 12 includes a generally open interior 22 defined by a peripheral outer wall 24. The outer wall 24 is aligned with the forming collar such that the packaging film 20 surrounds the fill tube 12 to create the product package. As shown in FIGS. 3 and 5, the zipper 16 enters the fill tube and is received within a guide block 26. The guide block 26 includes a shaped groove 28. Both the guide block 26 and the shaped groove 28 extend along the entire length of the fill tube 12.

As can best be seen in FIG. 5, the guide block 26 includes an outer face surface 30 that is generally aligned with the outer wall 24 of the fill tube.

Referring back to FIG. 4, the zipper 16 is comprised of a pair of mating profiles 32 and 34. The mating profiles 32 and 34 are joined together in a locking section 36, as is conventional. Each of the profiles 32 and 34 include an extended flange 38. Each flange includes a score 40 that encourages the flange 38 to fold over, as will be described.

Referring now to FIG. 5, when the zipper 16 is introduced into the guide block 26, the pair of flanges 38 are bent outward and urged into contact with the outer face surface 30 of the guide block 26 by a knockdown plate 42. The knockdown plate 42 extends across the entire length of the guide block 26 and creates a gap 44 between the knockdown plate 42 and the guide block 26. The gap 44 is large enough to receive each of the profiles 38, as shown. As can be seen in FIG. 2, the knockdown plate 42 extends only along the initial portion of the feed tube 12, since the knockdown plate 42 functions to initially lay the flange 38 of each profile 32 and 34 into contact with the guide block.

Figure 6:
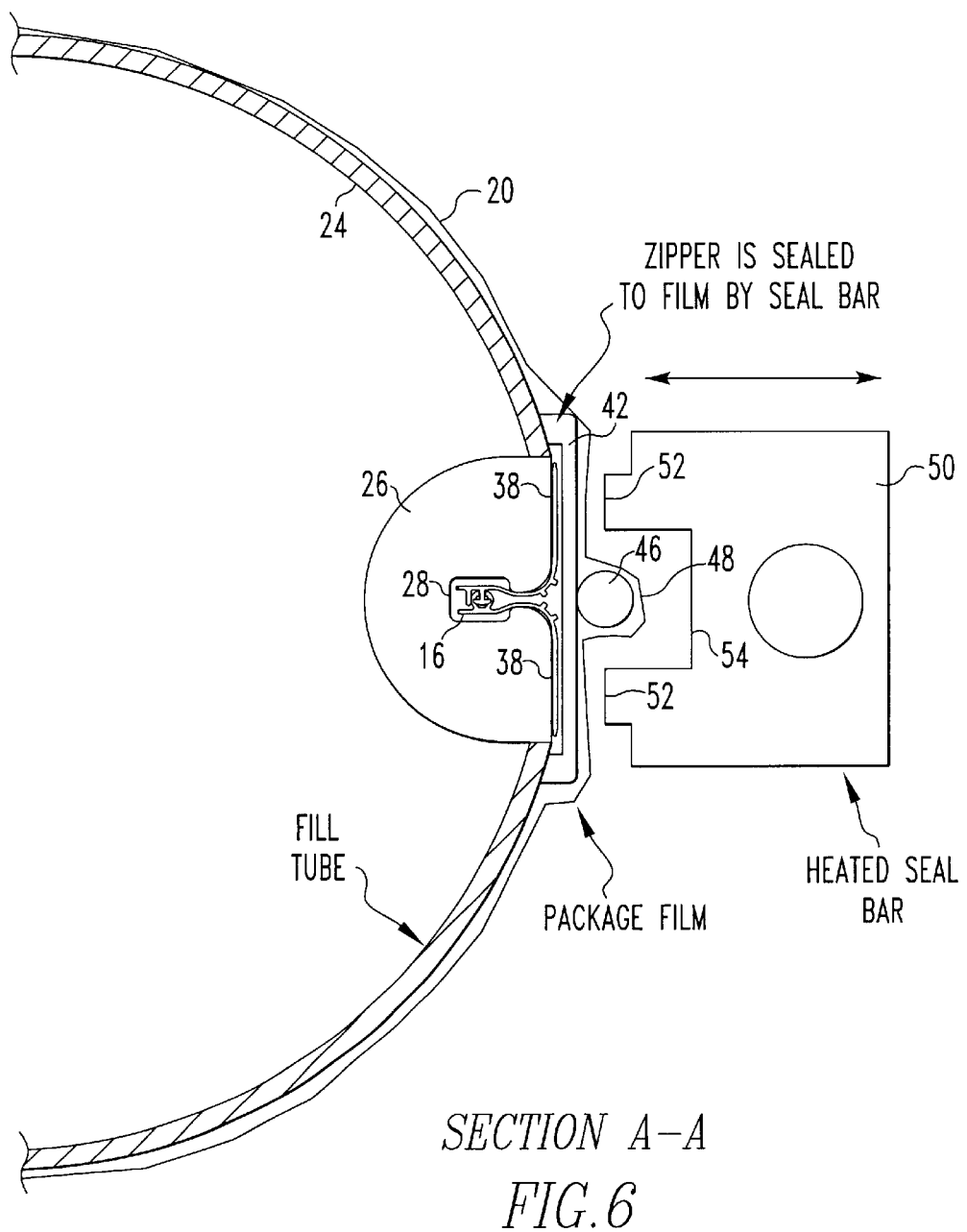
FIG. 6 is a section view taken along line A—A of FIG. 1.

Once the pair of flanges 38 on the zipper are laid down against the outer surface of the fill tube, the zipper continues to move downward along the length of the fill tube within the guide block 26. As shown in FIG. 6, the package film 20 wraps around the outer surface of the fill tube outer wall 24 and passes over the zipper 16. Specifically, the film 20 passes over a rod 46 that extends along a portion of the length of the fill tube 12. The rod 46 provides for a header portion 48 in the film, which will later be removed to provide access to the resealable package created by the method of the present invention. Although not shown, a tear strip or other easy open feature such as a mechanical or laser score (added to film) could be inserted into the header portion 48.

As illustrated in FIG. 6, a heated seal bar 50 is movable toward and away from the fill tube to seal the film 20 to each of the flanges 38 of the zipper 16. Specifically, the seal bar 50 includes a pair of sealing surfaces 52 that are spaced by a central channel 54. As illustrated, the central channel 54 straddles the rod and thus allows the rod 46 to avoid contact with the seal bar 50 during the sealing operation.

As can be seen in FIG. 1, the rod 46 extends along only a portion of the fill tube 12 such that the sealing between the zipper and the package film occurs in this portion of the apparatus.

Figure 7:
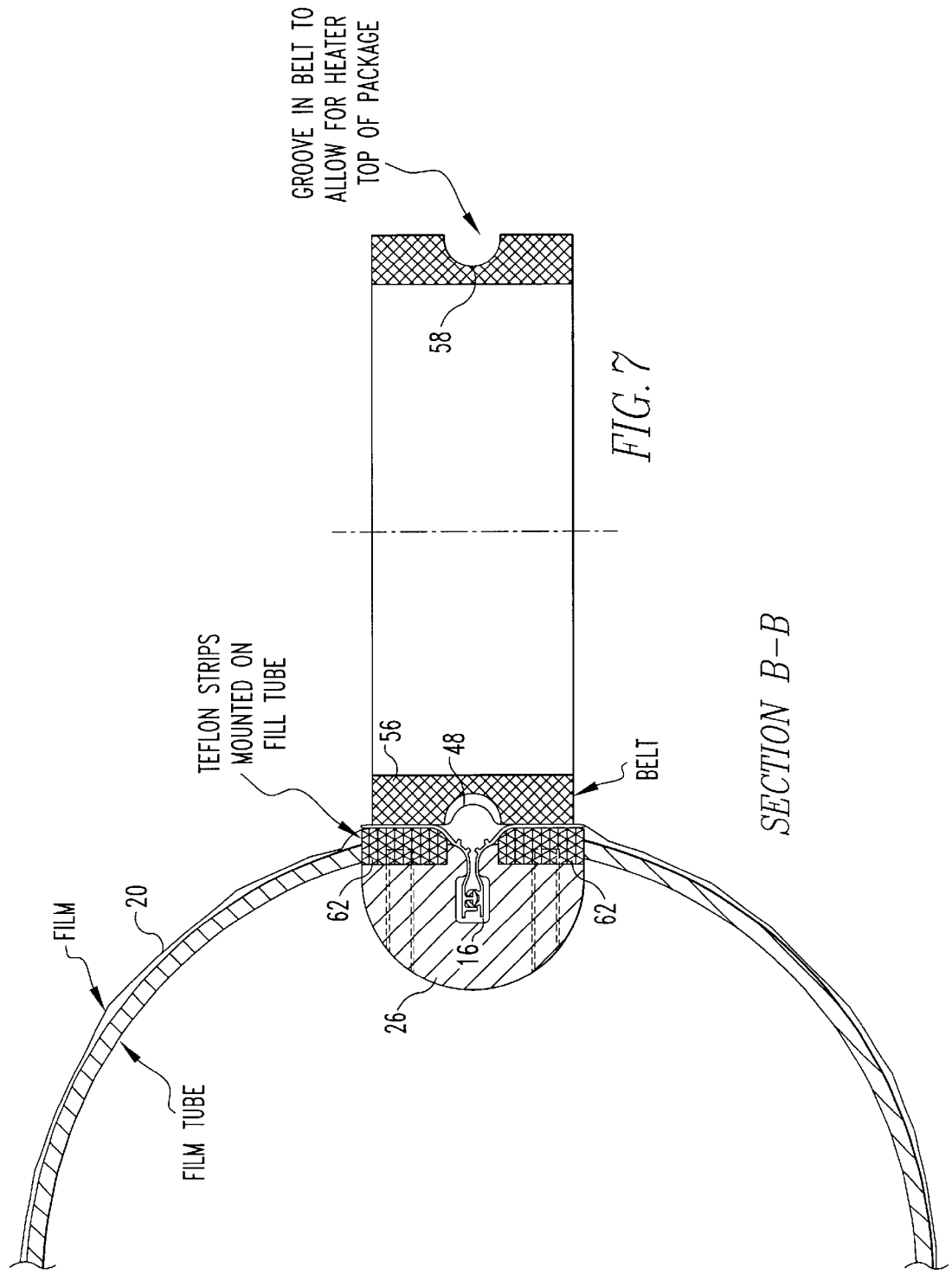
FIG. 7 is a section view taken along line B—B of FIG. 1.

Referring now to FIGS. 1 and 7, once the zipper 16 has been sealed to the film 20, a rotating belt 56 is used to move the formed tube, including the zipper, along the fill tube 12. As illustrated in FIG. 7, the belt 56 includes a groove 58 that compensates for the header 48 formed in the film. The fill tube includes a pair of low friction (Teflon®) strips 62 that provide for the required wear characteristics of the fill tube at this location.

As can also be seen in FIG. 7, the outer face surface of the guide block 26 extends past the outermost surface of the fill tube such that the zipper 16 begins to move out from the interior of the fill tube.

Figure 8:
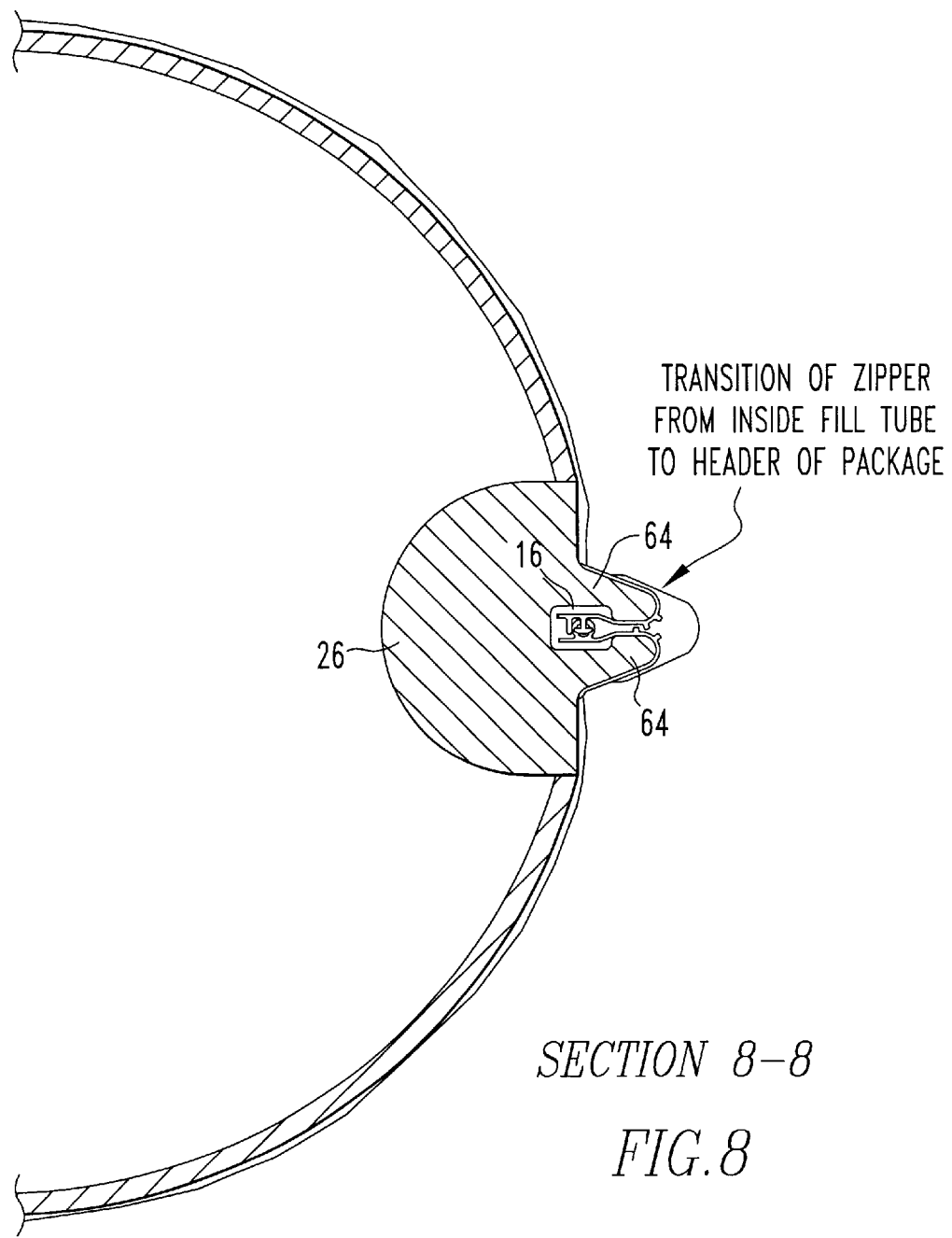
FIG. 8 is a section view taken along line C—C of FIG. 1.

Referring now to FIG. 8, as the zipper and film move further down the fill tube, the guide block 26 includes a pair of projecting fingers 64 that urge the zipper 16 further out of the interior of the fill tube.

Figure 9:
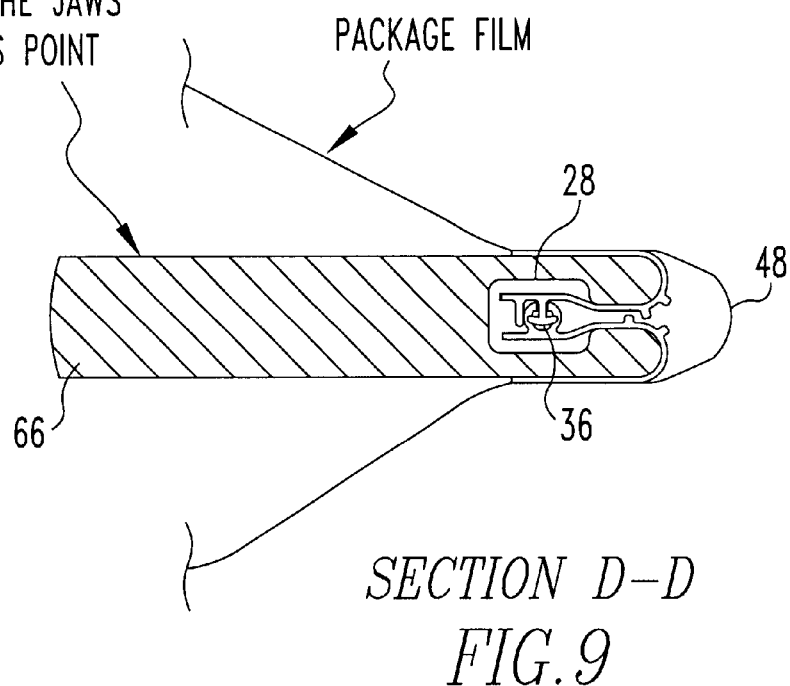
FIG. 9 is a section view taken along line D—D of FIG. 1.

As shown in FIG. 9, the guide block 26 transitions into a flat bar 66 that projects further from the fill tube. The flat bar 66 aids in the transition of the formed package from a tubular, open shape to a flat shape that can be side sealed to form the individual packages as desired. As illustrated in FIG. 9, the flat bar 66 includes the groove 28 that receives the locking section 36 of the zipper. As illustrated, the header 48 extends past the zipper and can include a tear strip or easy open feature that allows the product package to be opened, as is conventional.

Figure 10:
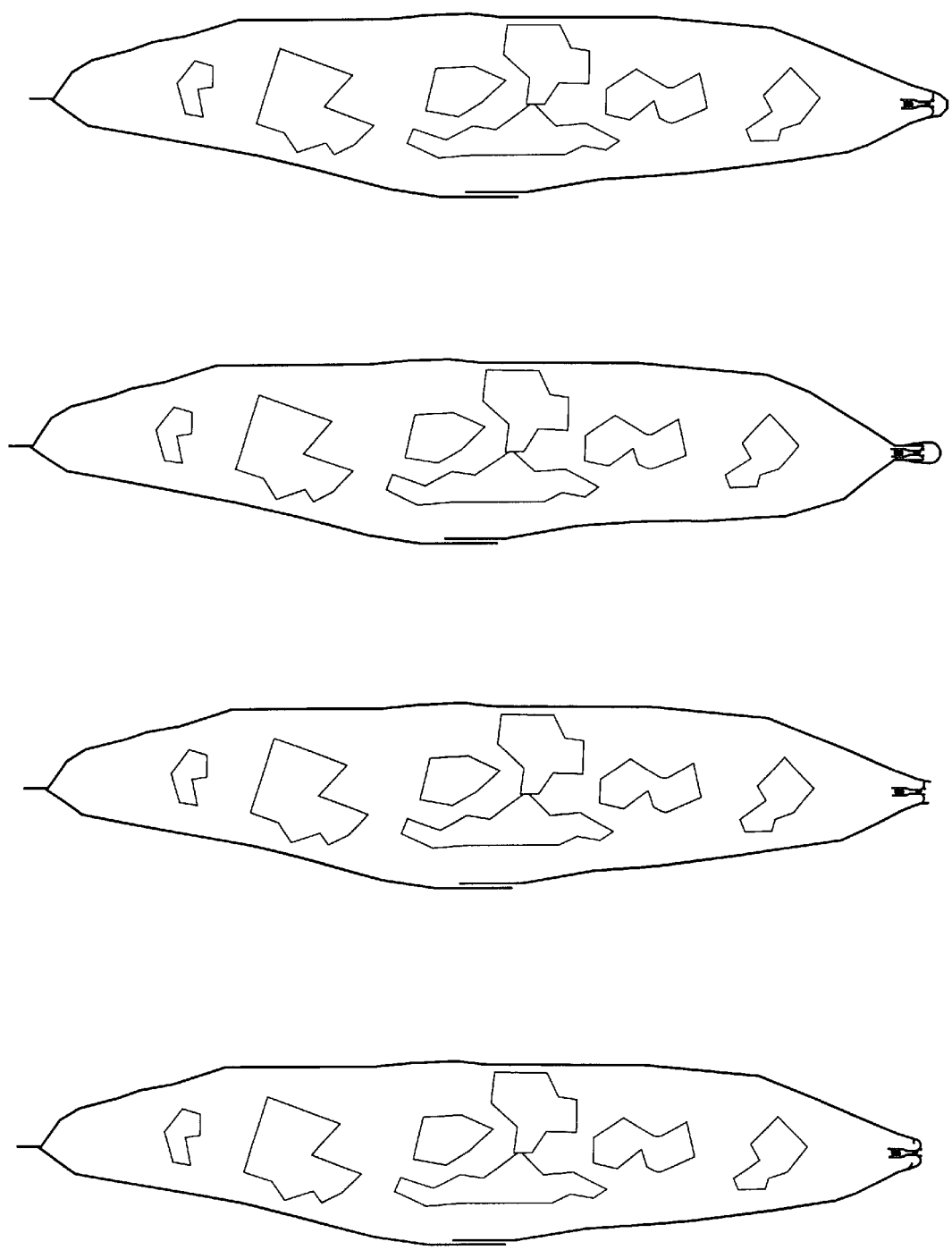
FIG. 10 is an illustration of possible package configurations utilizing the apparatus and method of the present invention.

Referring now to FIG. 10, thereshown are possible package configurations that can be formed using the apparatus and method of the present invention. Various alternatives and embodiments are contemplated as being within the scope of the following claims particularly pointing out and distinctly claiming the subject matter regarded as the invention.

What is claimed is:

1. An apparatus for applying a reclosable profile element to a packaging film in a form, fill and seal packaging operation, comprising:

a fill tube extending between an upper end and a lower end, the fill tube having an outer wall defining an open interior to receive a product to be loaded into a package formed by the apparatus;

a forming collar positioned at the upper end of the fill tube, the forming collar being configured to receive a continuous supply of packaging film and wrap the packaging film around the fill tube;

a guide block mounted to the fill tube for receiving the profile element, the guide block having a groove shaped to receive a locking portion of the profile element, wherein the guide block is positioned within the open interior of the fill tube at the upper end of the fill tube and extends past the outer wall of the fill tube at the lower end of the fill tube; and a sealing means for longitudinally sealing said profile element to said film along said fill tube.

2. The apparatus of claim 1 wherein the reclosable profile element includes a pair of profiles each having an extended flange, wherein the apparatus further comprises a knockdown plate spaced from the outer wall of the fill tube near the upper end of the fill tube, wherein the knockdown plate forces the flange of each profile of the reclosable profile element into contact with the outer wall of the fill tube.

3. The apparatus of claim 1 further comprising a spacing rod mounted adjacent to the outer wall of the fill tube, wherein the packaging film passes over the spacing rod such that the spacing rod is positioned between the packaging film and the fill tube.

4. The apparatus of claim 3 wherein the sealing means is positioned to be movable into and out of contact with the fill tube such that the sealing means forms a heat seal between the packaging film and the flanges of the profile element on opposite sides of the spacing rod.

5. The apparatus of claim 1 wherein the profile element includes a score mark formed on each of its flanges.

6. The apparatus of claim 1 wherein the shaped groove formed in the guide block receives the locking portion of the profile element and includes a tapered throat having a width less than the width of the locking portion to prevent the locking portion from passing through the tapered throat.

7. A method of applying a reclosable profile element to a packaging film comprising the steps of:

forming a web of packaging film over a forming collar and into a tubular shape about a central fill tube, the central fill tube having an upper end and a lower end and a generally open interior;

threading a reclosable profile element into a guide block at the upper end of the fill tube, the guide block being positioned in the open interior of the fill tube, the guide block including a shaped groove sized to receive a locking portion of the profile element;

pressing a pair of extended flanges of the profile element into contact with the outer surface of the fill tube;

positioning a spacing rod adjacent to the upper end of the fill tube, wherein the packaging film is wrapped around the fill tube and the spacing rod;

moving a heated seal bar into contact with the package film such that the package film longitudinally seals with the flanges of the profile element, wherein the seal bar includes a pair of sealing surfaces spaced on opposite sides of the spacing rod such that the package film is sealed to the profile element on opposite sides of the spacing rod; and advancing the tubular shaped packaging film and profile element from the upper end to the lower end of the fill tube, wherein the guide block extends from the outer wall of the film tube at the bottom end of the fill tube.

8. An apparatus for applying a reclosable profile element to a packaging film in a form, fill and seal packaging operation, comprising:

a fill tube extending between an upper end and a lower end, the fill tube having an outer wall defining an open interior to receive a product to be loaded into a package formed by the apparatus;

a forming collar positioned at the upper end of the fill tube, the forming collar being configured to receive a continuous supply of packaging film and wrap the packaging film around the fill tube;

a guide block mounted to the fill tube for receiving the profile element, the guide block having a groove shaped to receive a locking portion of the profile element, wherein the guide block is positioned within the open interior of the fill tube at the upper end of the fill tube and extends past the outer wall of the fill tube at the lower end of the fill tube; and a sealing bar for longitudinally sealing said profile element to said film along said fill tube.

9. The apparatus of claim 8 wherein the reclosable profile element includes a pair of profiles each having an extended flange, wherein the apparatus further comprises a knockdown plate spaced from the outer wall of the fill tube near the upper end of the fill tube, wherein the knockdown plate forces the flange of each profile of the reclosable profile element into contact with the outer wall of the fill tube.

10. The apparatus of claim 8 further comprising a spacing rod mounted adjacent to the outer wall of the fill tube, wherein the packaging film passes over the spacing rod such that the spacing rod is positioned between the packaging film and the fill tube.

11. The apparatus of claim 8 wherein said sealing bar is positioned to be movable into and out of contact with the fill tube, wherein the sealing bar includes a pair of spaced sealing surfaces positioned on opposite sides of the spacing rod such that the sealing bar forms a heat seal between the packaging film and the flanges of the profile element on opposite sides of the spacing rod.

12. The apparatus of claim 8 wherein the profile element includes a score mark formed on each of its flanges.

13. The apparatus of claim 8 wherein the shaped groove formed in the guide block receives the locking portion of the profile element and includes a tapered throat having a width less than the width of the locking portion to prevent the locking portion from passing through the tapered throat.

* * * * *